United States Patent
Iwashima et al.

(10) Patent No.: US 7,339,352 B2
(45) Date of Patent: Mar. 4, 2008

(54) BATTERY PACK MALFUNCTION DETECTION APPARATUS AND BATTERY PACK MALFUNCTION DETECTION METHOD

(75) Inventors: Makoto Iwashima, Yokosuka (JP); Tetsuya Niikuni, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 446 days.

(21) Appl. No.: 10/808,557

(22) Filed: Mar. 25, 2004

(65) Prior Publication Data

US 2004/0196007 A1    Oct. 7, 2004

(30) Foreign Application Priority Data

Apr. 4, 2003   (JP) ............................. 2003-101213

(51) Int. Cl.
   *H02J 7/00* (2006.01)
(52) U.S. Cl. ................ 320/134; 320/132; 320/136; 320/DIG. 13
(58) Field of Classification Search ................ 320/122, 320/130, 132, 134, 136, DIG. 13
   See application file for complete search history.

(56) References Cited

U.S. PATENT DOCUMENTS 4,871,956 A * 10/1989 Barrella ..................... 320/135
6,836,095 B2 * 12/2004 Fogg .......................... 320/128
2003/0015995 A1 * 1/2003 Tamura et al. .............. 320/162
2004/0032238 A1 * 2/2004 Miyagi ....................... 320/166

FOREIGN PATENT DOCUMENTS

JP        2001-25173       1/2001

* cited by examiner

*Primary Examiner*—Bao Q. Vu
*Assistant Examiner*—Samuel Berhanu
(74) *Attorney, Agent, or Firm*—McDermott Will & Emery LLP

(57) ABSTRACT

A malfunction detection circuit that detects a cell malfunction alternately outputs the results of an overcharge detection executed during an overcharge detection period and the results of an over-discharge detection executed during an over-discharge detection period through time sharing based upon a clock signal. When the cell is in the normal range, the signal level of the signal output during the overcharge detection period is different from the signal level of the signal output during the over-discharge detection period. Thus, in the malfunction detection, the signal generated when an overcharge malfunction has occurred in the cell can be distinguished from the signal generated when an over-discharge malfunction has occurred in the cell.

8 Claims, 2 Drawing Sheets

| DECISION-MAKING VOLTAGE | CURRENT BYPASS | MALFUNCTION (OVERCHARGE) DETECTION | MALFUNCTION (OVER-DISCHARGE) DETECTION |
|---|---|---|---|
| | $V11 = \dfrac{Ra13}{Ra12 + Ra13} Vcc1$ | $V12 = \dfrac{Rb12 + Rb13}{Rb11 + Rb12 + Rb13} Vcc1$ | $V13 = \dfrac{Rb12}{Rb11 + Rb12} Vcc1$ |

BATTERY PACK MALFUNCTION DETECTION APPARATUS AND BATTERY PACK MALFUNCTION DETECTION METHOD

BACKGROUND OF THE INVENTION

1. Field of the Invention

The present invention relates to an apparatus of and method for detecting a malfunction of a battery pack constituted of a plurality of cells.

2. Description of the Related Art

There is a battery pack malfunction decision-making apparatus in the known art that detects the voltage at each of the cells constituting a battery pack, detects an overcharged state in a cell by comparing the detected cell voltage with an upper limit voltage and detects an over-discharged state in the cell by comparing the detected cell voltage with a lower limit voltage (see Japanese Laid Open Patent Publication No. 2001-25173).

SUMMARY OF THE INVENTION

However, there is a problem with the battery pack malfunction decision-making apparatus in the related art in that since the output from an overcharge detection circuit and the output from an over-discharge detection circuit first undergo a logic portion executed at an AND circuit and then the results of the logic operation are output, an overcharge malfunction cannot be distinguished from an over-discharge malfunction.

The present invention provides a battery pack malfunction detection apparatus of and method for identifying the state of a cell by distinguishing an overcharged state from an over-discharged state when detecting a malfunction of a cell.

A battery pack malfunction detection apparatus according to the present invention that detects a malfunction in a battery pack constituted with a plurality of chargeable/dischargeable cells comprises malfunction detection devices, each provided in correspondence to a predetermined number of cells to detect an overcharge malfunction in the corresponding predetermined number of cells during an overcharge detection period and to detect an over-discharge malfunction in the corresponding predetermined number of cells during an over-discharge detection period and a decision-making device that makes a decision as to whether or not a cell in an overcharge malfunction state or a cell in an over-discharge malfunction state exists based upon a signal input from each of the malfunction detection devices. In this battery pack malfunction detection apparatus, each of the malfunction detection devices outputs a first signal if an overcharge malfunction is detected in any of the corresponding predetermined number of cells and outputs a second signal if no overcharge malfunction is detected during the overcharge detection period, outputs the second signal if an over-discharge malfunction is detected in any of the corresponding predetermined number of cells and outputs the first signal if no over-discharge malfunction is detected during the over-discharge detection period, and alternately outputs the output signal during the overcharge detection period and the output signal during the over-discharge detection period to the decision-making device through time sharing.

In a battery pack malfunction detection method for detecting a malfunction in a battery pack constituted with a plurality of chargeable/dischargeable cells, a first signal is generated upon detecting an overcharge malfunction in any of the cells and a second signal is generated if no overcharge malfunction is detected during an overcharge detection period, the second signal is generated upon detecting an over-discharge malfunction in any of the cells and the first signal is generated if no over-discharge malfunction is detected during an over-discharge detection period, the signal generated during the overcharge detection period and the signal generated during the over-discharge detection period are alternately output through time sharing and a decision is made as to whether or not there is a cell manifesting an overcharge malfunction or an over-discharge malfunction based upon the signal output through time sharing.

DETAILED DESCRIPTION OF THE PREFERRED EMBODIMENT

Figure 1:
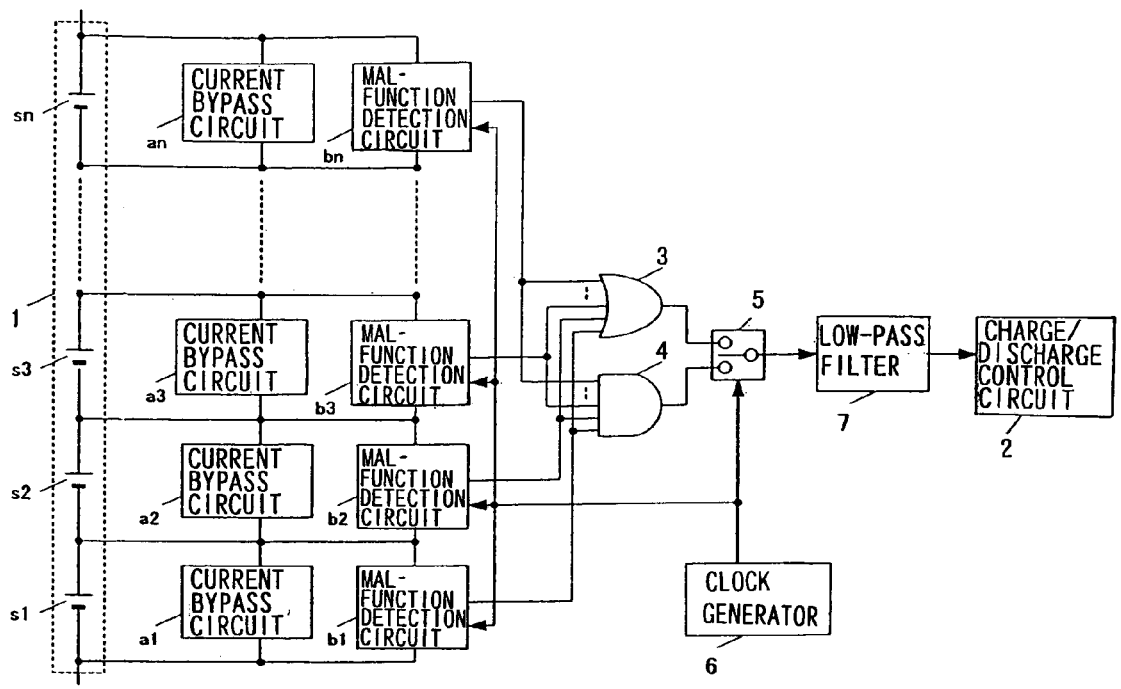
FIG. 1 shows the structure adopted in the battery pack malfunction detection apparatus in an embodiment of the present invention.

FIG. 1 shows the structure adopted in the battery pack malfunction detection apparatus in an embodiment of the present invention. The battery pack malfunction detection apparatus in the embodiment includes current bypass circuits a1 to an, malfunction detection circuits b1 to bn, a charge/discharge control circuit 2, an OR circuit 3, an AND circuit 4, a switch 5, a clock generator (a clock generation circuit) 6 and a low-pass filter 7.

A battery pack 1 is constituted by connecting in series n (n is a natural number) cells s1 to sn that can be charged/discharged. The battery pack 1 may be utilized as, for instance, an electric power supply source for a motor mounted in an electric car. The current bypass circuits a1 to an and the malfunction detection circuits b1 to bn are respectively provided in correspondence to the cells s1 to sn.

As a terminal voltage at any of the cells s1 to sn is detected to have risen above a first predetermined voltage V11 indicating that the cell is now in an almost fully charged state, the corresponding current bypass circuit a1 causes part of the current flowing to the cell to bypass the cell. The DOD (depth of discharge) varies among the individual cells and, accordingly, the current bypassing function of the current bypass circuit provided in correspondence to the cell having been charged to an almost fully charged state is activated to reduce the charge current flowing to the cell. At the same time, the other cells which have not been charged to an almost fully charged state are continuously charged, thereby minimizing the inconsistency in the capacity among the individual cells. The structure adopted in the current bypass circuits is to be described in detail later in reference to FIG. 2.

The malfunction detection circuits b1 to bn each detect that the terminal voltage of the corresponding cell has risen above a second predetermined voltage V12 indicating that the cell is in an overcharged state during a charge operation and also detect that the terminal voltage at the corresponding cell has become lower than a third predetermined voltage V13 indicating that the cell is in an over-discharged state during a discharge operation. Namely, the malfunction detection circuits b1 to bn function as overcharge malfunction detection circuits and also as over-discharge malfunction detection circuits. Signals each indicating an overcharge malfunction or an over-discharge malfunction in a cell are output from the corresponding malfunction detection circuit among the malfunction detection circuits b1 to bn to the OR circuit 3 and the AND circuit 4.

The signal level of the malfunction detection signal output from each of the malfunction detection circuits b1 to bn shifts in conformance to whether an overcharged state or an over-discharged state has been detected in the corresponding cell. When the malfunction detection circuits b1 to bn are each operating as an overcharge malfunction detection circuit, an L (low) level signal is output if the corresponding cell is normal and an H (high) level signal is output if the cell is in an overcharged state. When the malfunction detection circuits b1 to bn are each operating as an over-discharge malfunction detection circuit, an H level signal is output if the corresponding cell is normal and an L level signal is output if the cell is in an over-discharged state. The malfunction detection circuits b1 to bn are set to function as overcharge malfunction detection circuits or over-discharge malfunction detection circuits based upon a clock signal input from the clock generator 6.

It is to be noted that an L level signal indicates a state in which no current is flowing, whereas an H level signal indicates a state in which a current is flowing.

The OR circuit 3 executes an OR operation by using the results of the malfunction detections input from all the malfunction detection circuits b1 to bn. The AND circuit 4 executes an AND operation by using the results of the malfunction detections input from all the malfunction detection circuits b1 to bn. The results of the OR operation executed at the OR circuit 3 and the results of the AND operation executed at the AND circuit 4 are input to the switch 5.

In conformance with the clock signal input from the clock generator 6, the switch 5 selects either the signal output from the OR circuit 3 or the signal output from the AND circuit 4 and then outputs the selected signal to the low-pass filter 7.

Since the signals are input from the various malfunction detection circuits b1 to bn to the OR circuit 3 or the AND circuit 4 with varying extents of signal delay, chattering may occur in the output of the OR circuit 3 or in the output of the AND circuit 4 or in the output of the switch 5. In other words, a phenomenon may occur whereby the signal output via the switch 5 is switched to H level and then to L level repeatedly over very short intervals. Accordingly, the signal output via the switch 5 is made to go through the low-pass filter 7 before it is input to the charge/discharge control circuit 2 so as to input a chatter-free signal to the charge/discharge control circuit 2.

The clock generator 6 generates a clock signal which is output as a binary signal alternately indicating H level and L level. The clock signal generated at the clock generator 6 is input to all the malfunction detection circuits b1 to bn and the switch 5.

When the clock signal is at L level, the malfunction detection circuits b1 to bn operate as overcharge malfunction detection circuits and the switch 5 selects the signal output from the OR circuit 3. When the clock signal is at H level, the malfunction detection circuits b1 to bn operate as over-discharge malfunction detection circuits and the switch 5 selects the signal output from the AND circuit 4.

As described above, while the malfunction detection circuits b1 to bn are functioning as overcharge malfunction detection circuits, each malfunction detection circuit outputs an L level signal if the corresponding cell is normal and outputs an H level signal if the corresponding cell as in an overcharged state. As a result, when all the cells s1 to sn are in the normal range, an L level signal is input to the charge/discharge control circuit 2 via the OR circuit 3 and the switch 5. If, on the other hand, any of the cells is in an overcharged state, the signal output from the OR circuit 3 indicates H level and an H level signal is input to the charge/discharge control circuit 2.

While the malfunction detection circuits b1 to bn are functioning as over-discharge malfunction detection circuits, each malfunction detection circuit outputs an H level signal if the corresponding cell is normal and outputs an L level signal if the corresponding cell is in an over-discharged state. As a result, when all the cells s1 to sn are in the normal range, an H level signal is input to the charge/discharge control circuit 2 via the AND circuit 4 and the switch 5. If, on the other hand, any of the cells is in an over-discharged state, the signal output from the AND circuit 4 indicates L level and an L level signal is input to the charge/discharge control circuit 2.

Figure 2:
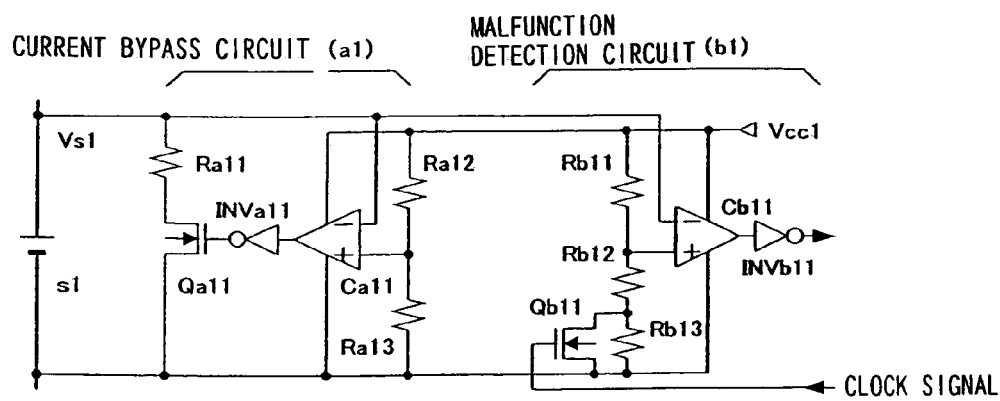
FIG. 2 shows in detail the structures of the current bypass circuit a1 and the malfunction detection circuit b1 connected in parallel to the cell s1.

FIG. 2 shows in detail the structures adopted in the current bypass circuit a1 and the malfunction detection circuit b1 connected in parallel to the cell s1. The current bypass circuit a1 includes a comparator (voltage comparator) Ca11, resistors Ra11, Ra12 and Ra13, an N-type MOS transistor Qa11 and an inverter INVa11.

A terminal (positive pole) voltage Vs1 at a terminal of the cell s1 is applied to the negative (−) terminal of the comparator Ca11. A voltage V11 ($=Vcc1 \cdot Ra13/(Ra12+Ra13)$) achieved by splitting a source voltage Vcc1 between the resistors Ra12 and Ra13 is applied to the positive (+) terminal at the comparator Ca11.

An output terminal of the comparator Ca11 is connected to a gate terminal of the MOS transistor Qa11 via the inverter INVa11. The source terminal of the MOS transistor Qa11 is connected to the negative terminal of the cell s1, whereas the drain terminal of the MOS transistor is connected to the positive terminal of the cell s1 via the resistor Ra11.

It is to be noted that the comparator Ca11 outputs an L level signal if the terminal voltage Vs1 applied to its − terminal is higher than the first predetermined voltage V11 applied to the + terminal. In this situation, an H level signal is input (an H level voltage is applied) to the gate terminal of the MOS transistor Qa11 via the inverter INVa11, thereby turning on the MOS transistor Qa11. As the MOS transistor Qa11 is turned on, part of the charge current starts to flow via the resistor Ra11. The current bypassing function of the current bypass circuit a1 is thus in effect.

Namely, the first predetermined voltage V11 is a threshold voltage value used to cause the charge current to bypass the cell s1, which should be set in advance to an appropriate value determined through testing and the like.

The malfunction detection circuit b1 includes a comparator Cb11, resistors Rb11, Rb12 and Rb13, an N-type MOS transistor Qb11 and an inverter INVb11. The terminal (positive pole) voltage Vs1 at the cell s1 is applied to the negative (−) terminal of the comparator Cb11. The voltage applied to the positive (+) terminal of the comparator Cb11 is changed depending upon whether the MOS transistor Qb11 connected in parallel to the resistor Rb13 is on or off. When the MOS transistor Qb11 is in an OFF state, a voltage V12 (=Vcc1·(Rb12+Rb13)/(Rb11+Rb12+Rb13)) achieved by splitting the source voltage Vcc1 between the resistor Rb11 and the composite resistor (Rb12+Rb13) constituted of the resistors Rb12 and Rb13 is applied to the positive terminal. When the MOS transistor Qb11 is in an ON state, however, a voltage V13 (=Vcc1·Rb12/(Rb11+Rb12)) achieved by splitting the source voltage Vcc1 between the resistor Rb11 and the resistor Rb12 is applied.

The output terminal of the comparator Cb11 is connected to the OR circuit 3 and the AND circuit 4 explained earlier via the inverter INVb11. In other words, the signal output via the inverter INVb11 constitutes the output of the malfunction detection circuit b1.

The source terminal of the MOS transistor Qb11 is connected to the negative terminal of the cell s1, whereas the drain terminal of the MOS transistor Qb11 is connected to a connecting point of the resistors Rb12 and Rb13. The clock signal generated at the clock generator 6 is input to the gate terminal of the MOS transistor Qb11.

When the clock signal is at L level, the MOS transistor Qb11 is in an OFF state and thus, the voltage V12 is applied to the + terminal of the comparator Cb11. When the clock signal is at H level, on the other hand, the MOS transistor Qb11 is in an ON state and the voltage V13 is applied to the + terminal of the comparator Cb11. This structure allows the malfunction detection circuits b1 to bn to operate as overcharge malfunction detection circuits when the clock signal is at L level and to operate as over-discharge malfunction detection circuits when the clock signal is at H level. In other words, the voltage V12 is an overcharge decision-making voltage used to detect an overcharged state in each cell whereas the voltage V13 is an over-discharge decision-making voltage used to detect an over-discharged state in each cell.

Figures 3, 4:
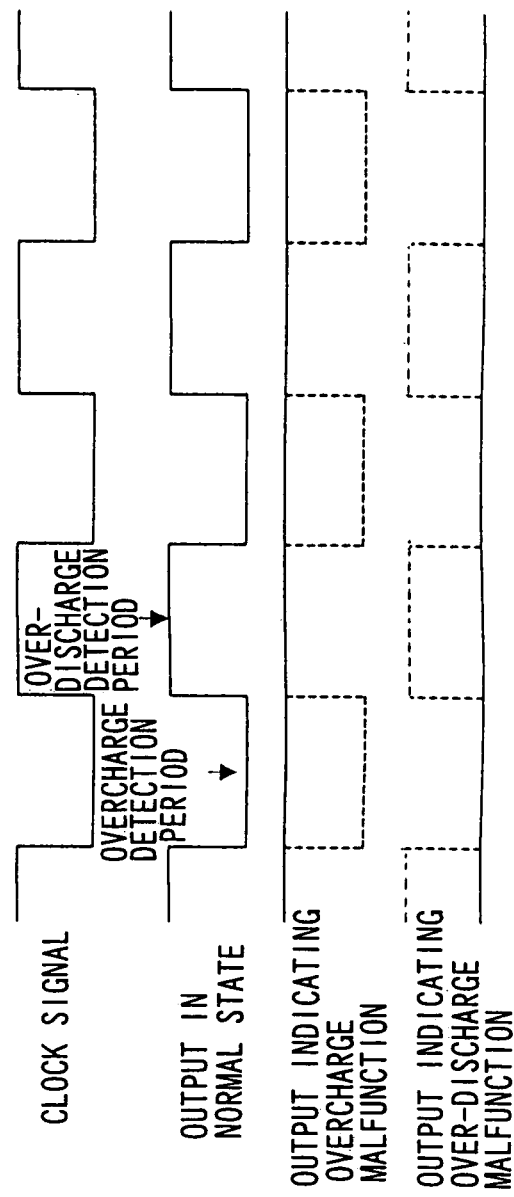
FIG. 3 presents at-a-glance definitions of the decision-making voltage V11 used in the current bypass circuit and the decision-making voltages V12 and V13 used in the malfunction detection circuit.
FIG. 4 shows the relationship between the signal level of the clock signal and the signal level of the signal input to the charge/discharge control circuit as it manifests under different circumstances, i.e., when the cells are functioning normally, when one of the cells is in an overcharged state and when one of the cells is in an over-discharged state.

It is to be noted that a relationship expressed as V12>V11>V13 is achieved by the first predetermined voltage V11, the second predetermined voltage V12 and the third predetermined voltage V13. The expressions defining the individual predetermined voltages V11 to V13 are shown in FIG. 3.

The following is an explanation of the operations of the current bypass circuit a1 and the malfunction detection circuit b1, as executed in specific manners in correspondence to the level of the terminal voltage Vs1 at the cell s1.
(when Vs1<V13)

In this situation, Vs1<V13<V12 is true, and thus, the output signal from the comparator Cb11 indicates H level regardless of the signal level of the clock signal. Accordingly, the output signal of the malfunction detection circuit b1 output via the inverter INVb11 is sustained at L level at all times. When the clock signal is at L level and the malfunction detection circuit b1 is operating as an overcharge malfunction detection circuit, the L level output signal constitutes a normal signal, whereas it constitutes a malfunction signal when the clock signal is at H level and the malfunction detection circuit b1 is operating as an over-discharge malfunction detection circuit. It is to be noted that since the relationship expressed as Vs1<V11 is true under these circumstances, the current bypassing function of the current bypass circuit a1 is not in effect.
(when V13<Vs1<V11 (<V12))

In this case, if the clock signal is at L level, the voltage V12 is applied to the + terminal of the comparator Cb11 and, accordingly, the output signal of the malfunction detection circuit b11 output via the inverter INVb11 indicates L level. If, on the other hand, the clock signal is at H level, the voltage V13 is applied to the + terminal of the comparator Cb11 to set the output signal of the comparator Cb11 to H level. As a result, the output signal of the malfunction detection circuit b1 output via the inverter INVb11 indicates L level.

The signal output from the malfunction detection circuit b1 in this situation indicates that the cell is operating normally regardless of whether the malfunction detection circuit b1 is operating as an overcharge malfunction detection circuit or as an over-discharge malfunction detection circuit. It is to be noted that since the relationship expressed as Vs1<V11 is true under these circumstances, the current bypassing function of the current bypass circuit a1 is not in effect.
(when V11<Vs1<V12)

In this situation, the relationship expressed as V13<Vs1<V12 is sustained, and the signal output from the malfunction detection circuit b1 remains unchanged. Namely, the output signal from the malfunction detection circuit b1 indicates L level if the clock signal is at L level, and the output signal from the malfunction detection circuit b1 indicates H level if the clock signal is at H level.

However, since the relationship expressed as V11<Vs1 is true, the output of the comparator Ca11 is at L level and an H level voltage is applied to the gate terminal of the MOS transistor Qa11 via the inverter INVa11. In response, the MOS transistor Qa11 enters an ON state, thereby causing a bypass current to flow via the resistor Ra11 and the MOS transistor Qa11. In other words, the current bypassing function of the current bypass circuit a1 is in effect.
(when V12<Vs1)

In this situation, the relationship expressed as V13<V12<Vs1 is true, and accordingly, the output signal of the comparator Cb11 indicates L level regardless of the signal level of the clock signal. As a result, the output signal of the malfunction detection circuit b1 output via the inverter INVb11 is sustained at H level at all times. When the clock signal is at L level and the malfunction detection circuit b1 is operating as an overcharge malfunction detection circuit, this H level output constitutes a malfunction detection signal, whereas it constitutes a normal signal when the clock signal is at H level and the malfunction detection circuit b1 is operating as an over-discharge malfunction detection circuit. It is to be noted that since the relationship expressed as V11<Vs1 is true in this situation, too, the current bypassing function of the current bypass circuit a1 is in effect.

The signal levels of the signal input to the charge/discharge control circuit 2 under different circumstances are summarized in FIG. 4. As explained earlier, the malfunction detection circuits b1 to bn operate as overcharge malfunction detection circuits when the clock signal is at L level and operate as over-discharge malfunction detection circuits when the clock signal is at H level.

When all the cells s1 to sn are in the normal range, the malfunction detection circuits b1 to bn each output an H level signal and an L level signal alternately in correspondence to the signal level of the clock signal. Thus, as the H level clock signal and the L level clock signal are output alternately, an H level signal and an L level signal are alternately input to the charge/discharge control circuit 2, as shown in FIG. 4.

If one of the cells is in an overcharged state, an H level signal is input to the charge/discharge control circuit 2 regardless of the signal level of the clock signal, as shown in FIG. 4. If one of cells is in an over-discharged state, an L level signal is input to the charge/discharge control circuit 2 regardless of the signal level of the clock signal.

Thus, the charge/discharge control circuit 2 is enabled to detect whether all the cells are in the normal range or any of the cells is malfunctioning and also to identify the specific nature of a cell malfunction, i.e., whether the malfunctioning cell is in an overcharged state or in an over-discharged state, based upon the signal level of the signal input thereto via the switch 5.

As explained above, the battery pack malfunction detection apparatus achieved in the embodiment includes the malfunction detection circuits b1 to bn that detect overcharge malfunctions of the corresponding cells during an overcharge detection period and detects over-discharge malfunctions of the corresponding cells during an over-discharge detection period. The malfunction detection circuits b1 to bn each output a first signal (H level) upon detecting an overcharged state in the corresponding cell and output a second signal (L level) if an overcharged state is not detected in the corresponding cell. In addition, they each output the second signal (L level) upon detecting an over-discharged state in the corresponding cell and output the first signal (H level) if an over-discharged state is not detected in the corresponding cell. Furthermore, the malfunction detection circuits b1 to bn alternately output the output signals from the overcharge detection period and the output signals from the over-discharge detection period through time sharing. As a result, an overcharged state detected in a given cell can be distinguished from an over-discharged state.

The malfunction detection circuits b1 to bn each output an H level signal and an L level signal alternately as long as the corresponding cell among the cells s1 to sn is in the normal range. Thus, when a grounding failure occurs at any of the malfunction detection circuits b1 to bn and an L level signal is continuously output from the malfunction detection circuit, too, the malfunction can be detected at the charge/discharge control circuit 2.

The battery pack malfunction decision-making apparatus in the related art requires two types of malfunction detection circuits, i.e., overcharge detection circuits that detect an overcharged state in the corresponding cells and over-discharge detection circuits that detect an over-discharged state in the corresponding cells. The battery pack malfunction detection apparatus achieved in the embodiment, on the other hand, includes the malfunction detection circuits b1 to bn each having the comparator Cb11, which compares the terminal voltage at the cell with a reference voltage. The overcharge decision-making voltage is used as the reference voltage during the overcharge detection period and the over-discharge decision-making voltage is used as the reference voltage during the over-discharge detection period. As a result, it is possible to detect both an overcharge malfunction and an over-discharge malfunction in a given cell with a single malfunction detection circuit. Thus, the number of parts required to constitute the battery pack malfunction detection apparatus is reduced.

In addition, the battery pack malfunction detection apparatus achieved in the embodiment includes the clock generator 6, which generates the clock signal, and switches the malfunction detection circuits b1 to bn to engage in overcharge malfunction detection operation and discharge malfunction detection operation in conformance to the level of the clock signal (the internal clock). Thus, there is no need to connect an external switching signal line (a line for a trigger signal).

The above described embodiment is an example, and various modifications can be made without departing from the spirit and scope of the invention. For instance, while the clock signal output from the clock generator 6 is sustained at H level and at L level over substantially equal lengths of time, as shown in FIG. 4 in the example explained above, the clock signal may be sustained at the H level and the L level over different lengths of time. In the latter case, even when an overcharged state and an over-discharged state occur simultaneously in different cells, both the overcharged state and the over-discharged state in the cells can be detected.

Namely, when an overcharged state and an over-discharged state occur simultaneously in different cells, a signal achieved by inverting the signal indicating that the cells are in the normal range shown in FIG. 4 is input to the charge/discharge control circuit 2, i.e., an H level signal from the overcharge detection and an L level signal from the over-discharge detection are alternately input to the charge/discharge control circuit 2. Since the length of the overcharge detection period is different from the length of over-discharge detection period, a cell malfunction can be detected accurately.

In the battery pack malfunction detection apparatus achieved in the embodiment, the output signal indicates H level during the cell over-discharge detection period and indicates L level during the cell overcharge detection period as long as all the cells s1 to sn are in the normal range (see FIG. 4). Accordingly, by reducing the length of time over which the malfunction detection circuits b1 to bn are engaged in the overcharge detection, the current consumption in the entire battery pack malfunction detection apparatus can be lowered. In other words, the power consumption can be reduced by setting the length of time over which the clock signal output from the clock generator 6 is sustained at H level shorter than the length of time over which the clock signal is sustained at L level.

In addition, while the output signal indicates H level during the cell over-discharge detection period and indicates L level during the cell overcharge detection period when all the cells s1 to sn are in the normal range in the battery pack malfunction detection apparatus in the embodiment described above, these signal levels may be reversed.

While the malfunction detection circuits b1 to bn are provided in correspondence to the individual cells s1 to sn constituting the battery pack 1 to detect any malfunction in the corresponding cells s1 to sn, a malfunction detection circuit may be provided to serve a predetermined number of cells to detect any malfunction manifesting in the corresponding predetermined number of cells. Furthermore, a resistor may be inserted between the + terminal and the output terminal at the comparator Cb11 included in each of the malfunction detection circuits b1 to bn or the comparator Ca11 included in each of the current bypass circuits a1 to an so as to achieve hysteresis in the reference voltage applied to the + terminal.

The disclosures of the following priority application is herein incorporated by reference: Japanese Patent Application No. 2003-101213 filed Apr. 4, 2003

What is claimed is:

1. A battery pack malfunction detection apparatus that detects a malfunction in a battery pack constituted with a plurality of chargeable/dischargeable cells, comprising:

malfunction detection devices each provided in correspondence to a predetermined number of cells to detect an overcharge malfunction in the corresponding predetermined number of cells during an overcharge detection period and to detect an over-discharge malfunction in the corresponding predetermined number of cells during an over-discharge detection period;

a decision-making device that makes a decision as to whether or not a cell in an overcharge malfunction state or a cell in an over-discharge malfunction state exists based upon a signal input from each of the malfunction detection devices through a single signal line;

a clock signal generator; and a switch, wherein:

each of the malfunction detection devices outputs a first signal if an overcharge malfunction is detected in any of the corresponding predetermined number of cells and outputs a second signal if no overcharge malfunction is detected during the overcharge detection period, outputs the second signal if an over-discharge malfunction is detected in any of the corresponding predetermined number of cells and outputs the first signal if no over-discharge malfunction is detected during the over-discharge detection period, and the clock signal generator controls the switch to repeatedly select the output signal to the single signal line during the overcharge detection period and the output signal to the single signal line during the over-discharge detection period to the decision-making device.

2. A battery pack malfunction detection apparatus according to claim 1, wherein:

the decision-making device decides that there is a cell with an overcharge malfunction if the first signal is input from the malfunction detection device both during the overcharge detection period and during the over-discharge detection period.

3. A battery pack malfunction detection apparatus according to claim 1, wherein:

the decision-making device decides that there is a cell with an over-discharge malfunction if the second signal is input from the malfunction detection device both during the overcharge detection period and during the over-discharge detection period.

4. A battery pack malfunction detection apparatus according to claim 1, wherein:

each of the malfunction detection devices includes a voltage comparator that compares a terminal voltage at each of the corresponding predetermined number of cells with a reference voltage, outputs the first signal if the terminal voltage at any cell is higher than the reference voltage by using an overcharge decision-making voltage as the reference voltage during the overcharge detection period and outputs the second signal if the terminal voltage at any cell is lower than the reference voltage by using an over-discharge decision-making voltage as the reference voltage during the over-discharge detection period.

5. A battery pack malfunction detection apparatus according to claim 1, wherein:

each of the malfunction detection devices switches between an overcharge malfunction detection and an over-discharge malfunction detection based upon the clock signal generated by the clock generation device.

6. A battery pack malfunction detection apparatus according to claim 1, wherein:

the overcharge malfunction detection period and the over-discharge malfunction detection period extend over lengths of time different from each other.

7. A battery pack malfunction detection apparatus according to claim 1, wherein:

if a current consumed in the battery pack malfunction detection apparatus when the malfunction detection devices output a signal indicating that none of the corresponding predetermined number of cells is in an overcharged state is different from a current consumed in the battery pack malfunction detection apparatus when the malfunction detection devices output a signal indicating that none of the corresponding predetermined number of cells is in an over-discharged state, the signal requiring a larger current consumption is output over a smaller length of time than the signal requiring a smaller current consumption.

8. The battery pack malfunction detection apparatus according to claim 1, wherein the clock signal generator generates a clock signal which is input to each malfunction detection device and the switch.

* * * * *